UNITED STATES PATENT OFFICE.

DUNCAN GEDDES ANDERSON, OF GLASGOW, SCOTLAND.

PLASTIC COMPOSITION FOR FLOORING.

1,194,926.

Specification of Letters Patent. Patented Aug. 15, 1916.

No Drawing. Application filed March 23, 1915. Serial No. 16,420.

*To all whom it may concern:*

Be it known that I, DUNCAN GEDDES ANDERSON, a subject of the King of Great Britain and Ireland, and a resident of Mount Florida, Glasgow, Scotland, have invented a certain new and useful Plastic Composition for Flooring, of which the following is the specification.

Certain compositions comprising various filling materials such as wood sawdust, wood pulp, or wood meal, asbestos, or like material, and coloring matter, cemented together by various cementing materials, such for example as magnesium chlorid, calcined magnesite, gypsum, hydraulic cement, or the like, have come into use principally for coating ships' decks and the like; and the present invention has for its object to provide an improved composition of this type for the purposes described, which composition while it does not contain any ingredients which cause acid or corrosive salts to be set free in the presence of moisture and which is therefore not injurious to metal articles, such as ships' decks when applied thereto, gives at the same time a mixture of strong binding capacity which attains a hard and durable surface in a comparatively short time.

Two groups of materials are essential to the improved composition, one group being cementing ingredients comprising in combination a mixture of gypsum cement and a relatively small quantity of Portland cement, with or without a dilute solution of sodium aluminate.

By the term gypsum cements, it is to be clearly understood that such cements are only those products formed in known manner by calcining hydrated calcium sulfate, or natural rock gypsum (with or without the addition of salts, such as alum or borax, or acid or normal sulfates of the alkalis), to such a temperature that the resulting gypsum cement is nearly anhydrous; and it is to be understood that this term gypsum cements does not include the hemi-hydrated compound of gypsum known variously under the names of plaster of Paris, plaster, or stucco. The chemical and physical properties of this latter hemi-hydrated gypsum compound are very different from those of the nearly anhydrous compounds derived from gypsum which are obtained as above described, and are hereinbefore called gypsum cements. Plaster of Paris is calcium sulfate $CaSO_4.2H_2O$ heated until about half of the water of crystallization is removed. This partially dehydrated substance is not at all anhydrous, but takes up water readily and quickly sets hard. On the other hand the gypsum cements with which the present invention is concerned, comprise the same substance, calcium sulfate, heated to such an extent that its dehydration is practically complete: it is almost "dead burnt." This material is almost anhydrous and when water is added to it, it will not set quickly, in this respect differing markedly from ordinary plaster of Paris. Plaster of Paris is well known to have a disintegrating effect on Portland cement when mixed with it in any quantity, whereas it has been proved that gypsum cements in conjunction with Portland cement give a cementing material which has outstanding merits, when its particular use is to provide a composition to take the place of wood decking on shipboard. I have discovered that gypsum cement in combination with Portland cement gives a cementing composition which will not disintegrate. Furthermore, I have discovered that the addition of Portland cement to gypsum cement causes the latter to set in a much shorter time than it does without such addition and also gives a mixture of strong binding capacity attaining a hard and durable surface in a comparatively short time.

The other group consists of filling material added as usual with a view to render the composition light in weight and relatively soft and warm to the feet as is required by a flooring composition. This filling material may be largely varied, and it may comprise for example pumice, coke breeze, asbestos, sawdust, or like material, either single, or in a combination comprising a mixture of two or more of such ingredients.

In forming the improved composition, all the solid ingredients used are first intimately mixed together, and sufficient water added to form a stiff granular paste which is spread on the surface to be covered, then stamped down and surfaced by troweling all in usual manner. With the water there may be added a dilute solution of the sodium aluminate.

The subsidiary filling materials may be varied to a wide extent, and the proportions of those cementing ingredients essential in combination to the composition *i. e.* the gypsum cement and the Portland cement may also be varied. As indicative but not limitative the following example is given in parts by weight: substantially anhydrous gypsum 100 parts, Portland cement 15 parts, pumice 20 parts, sawdust 20 parts. These ingredients are made up into a stiff paste with either a 2% solution of sodium aluminate, or with water alone. Any suitable coloring matter may be added. The Portland cement is added to the gypsum cement to increase its hydraulic property as well as regulate the time of setting of the mixture. The sodium aluminate makes the composition as a whole alkaline in nature and not injurious to metal such as ships' decks when applied thereto. In addition it increases the binding capacity and hydraulic properties of the mixture.

What I claim is:—

1. In a plastic composition for flooring and the like, a mixture of substantially anhydrous gypsum and a relatively small quantity of Portland cement.

2. In a plastic composition for flooring and the like, a mixture of substantially anhydrous gypsum and a relatively small quantity of Portland cement, and a dilute solution of sodium aluminate.

3. In a plastic composition for flooring and the like, a mixture of substantially anhydrous gypsum and a relatively small quantity of Portland cement, together with relatively light filling materials adapted to render the composition suitable for flooring purposes.

4. In a plastic composition for flooring and the like, a mixture of substantially anhydrous gypsum and a relatively small quantity of Portland cement, and a dilute solution of sodium aluminate, together with relatively light filling materials adapted to render the composition suitable for flooring purposes.

5. A plastic composition for flooring and the like comprising a mixture approximating in parts by weight substantially anhydrous gypsum 100 parts, Portland cement 15 parts, pumice 20 parts, sawdust 20 parts, and water to form a stiff paste.

6. A plastic composition for flooring and the like comprising a mixture approximating in parts by weight substantially anhydrous gypsum 100 parts, Portland cement 15 parts, pumice 20 parts, sawdust 20 parts, and water in which is sodium aluminate sufficient to form a 2% solution.

In testimony whereof I have signed my name to this specification, in the presence of two subscribing witnesses.

DUNCAN GEDDES ANDERSON.

Witnesses:
 DAVID FERGUSON,
 WILFRED HUNT.